United States Patent [19]

Szepesi

[11] Patent Number: 4,700,285
[45] Date of Patent: Oct. 13, 1987

[54] COMBINED PWM-FM CONTROL METHOD AND CIRCUIT FOR THE HIGH EFFICIENCY CONTROL OF RESONANT SWITCH MODE INVERTERS/CONVERTERS

[75] Inventor: Tamas S. Szepesi, San Jose, Calif.
[73] Assignee: National Semiconductor Corporation, Santa Clara, Calif.
[21] Appl. No.: 932,453
[22] Filed: Nov. 18, 1986
[51] Int. Cl.[4] .......................................... H02M 7/5395
[52] U.S. Cl. ........................................ 363/97; 363/131
[58] Field of Search .................... 363/16, 26, 41, 97, 363/131; 315/307, 308

[56] References Cited

U.S. PATENT DOCUMENTS

| 3,596,165 | 7/1971 | Andrews | 363/16 |
| 4,535,399 | 8/1985 | Szepesi | 363/97 |
| 4,631,652 | 12/1986 | Wendt | 363/16 |

FOREIGN PATENT DOCUMENTS

| 2060220 | 8/1986 | United Kingdom | 363/16 |
| 2170663 | 8/1986 | United Kingdom | 363/16 |

Primary Examiner—William H. Beha, Jr.
Attorney, Agent, or Firm—Limbach, Limbach & Sutton

[57] ABSTRACT

A PWM-FM control method and circuit is employed to control the output level of a resonant switch-mode inverter/converter. The frequency of the inverter/converter is controlled via a nonlinear function shaper and VCO or ICO by the same voltage which controls the pulse-width such that the turn-on of the controlled switching element(s) always occur(s) at substantially zero voltage and substantially zero current across the switching element(s), thereby minimizing switching losses and maximizing efficiency.

8 Claims, 11 Drawing Figures

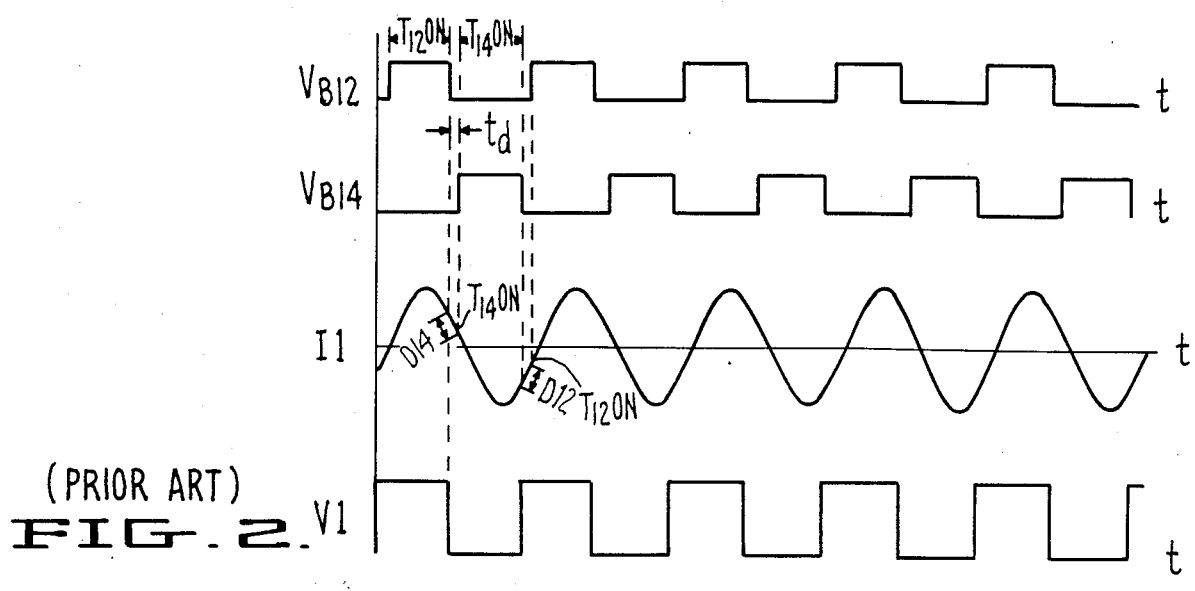
(PRIOR ART) FIG. 2.
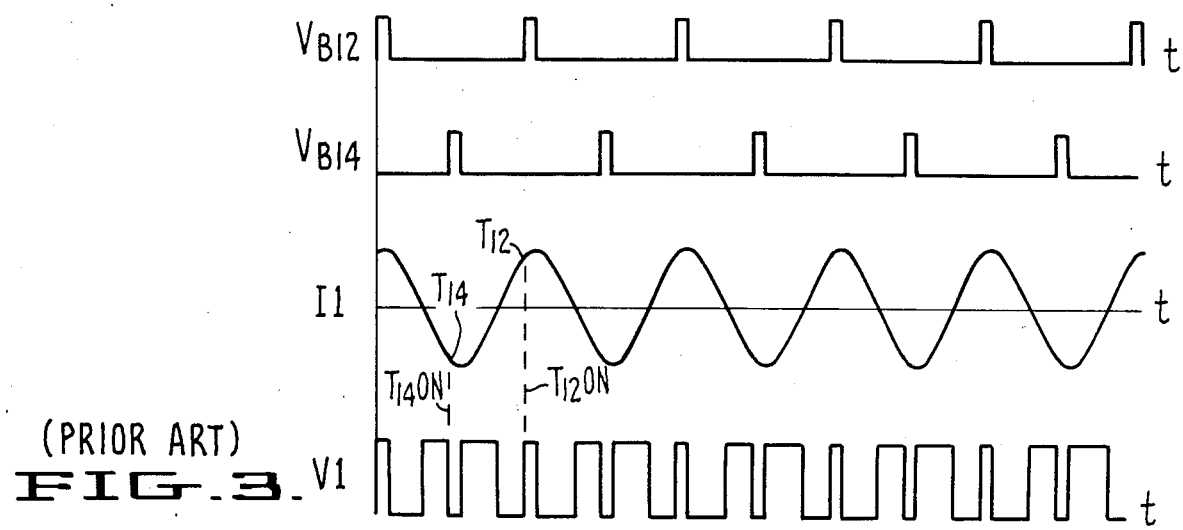
(PRIOR ART) FIG. 3.
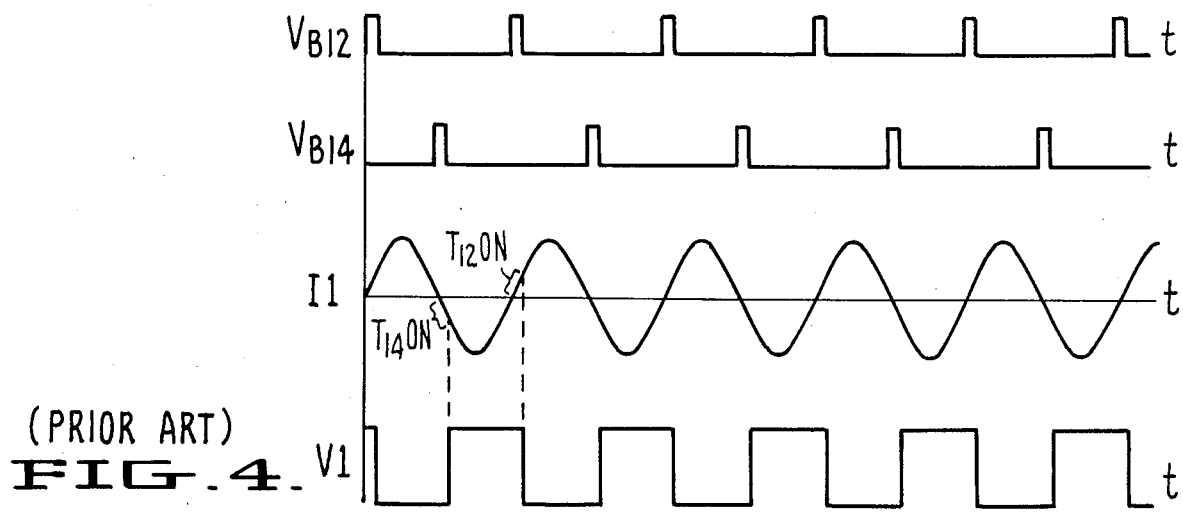
(PRIOR ART) FIG. 4.

COMBINED PWM-FM CONTROL METHOD AND CIRCUIT FOR THE HIGH EFFICIENCY CONTROL OF RESONANT SWITCH MODE INVERTERS/CONVERTERS

BACKGROUND OF THE INVENTION

1. Field of the Invention

The present invention relates to circuits for controlling the output level of switch-mode inverters/converters and, in particular, to combined PWM/FM regulation of resonant switch-mode circuits utilizing direct non-linear control of the frequency to minimize turn-on losses on the switching elements 2. Discussion of the Prior Art U.S. Pat. No. 4,535,399 issued Aug. 13, 1985, to Tamas S. Szepesi, and commonly assigned herewith, discloses a switching circuit in which frequency modulation (FM) is combined with pulse width modulation (PWM) to control the flow of power from a source to a resonant load.

According to the teachings of the '399 Szepesi patent, a power switch is employed to drive a resonant load from a DC source, whereby the DC input is converted to an AC drive. The power switch is pulse width modulated to control the power flow. The current flowing in the load is sampled and the sample is coupled to the input of a phase locked loop (PLL). The oscillator in the PLL, which is the signal source in the system, is thus phase locked to the load current. The PLL drives a pulse width modulator which also has an input that responds to a DC control voltage. The pulse width modulator operates a drive circuit which provides a waveform which is used to drive the power switch. This combination produces a drive waveform to the load whereby the power switch is actuated precisely at the load current zero crossing. This means not only that the power switch is turned on at zero current, but also that it is turned on at almost zero voltage. As the pulse width of the drive waveform is varied, the frequency of the PLL output is automatically driven to compensate so that zero current turn-on of the power switch is maintained for all pulse widths.

Thus, the circuit described in the Szepesi patent changes the operating frequency automatically so that the changing phase of the driving circuit's describing function due to pulse width modulation is always compensated by an opposite sign change of the phase shift of the resonant load.

Prior to Szepesi's invention, it was conventional to set the zero crossing condition of the pulse width modulator for the maximum power state. For any other pulse width condition, switching did not occur at the zero crossing and switching efficiency was impaired. Thus, the above-described Szepesi circuit represents a significant improvement over the prior art.

While Szepesi's above-described control technique achieves output level control with minimum frequency shift at every duty cycle, and accordingly, can be considered an ideal PWM/FM modulation scheme, it suffers from the disadvantage that its implementation requires relatively complex, expensive circuitry.

SUMMARY

It is an object of the present invention to provide a technique whereby ideal combined PWM-FM control of resonant inverters/converters is approximated to minimize switching losses at very low cost.

This and other objects of the invention are accomplished as follows. A power switch is utilized to drive a resonant load from a DC source which has been converted to an AC drive. The power switch is pulse width modulated to control the power flow. The pulsewidth modulator has two inputs. One is the frequency input, which is provided by a current or voltage controlled oscillator (ICO or VCO). The second input is a control voltage which determines the pulse-width. The control signal of the ICO or VCO is obtained from the pulsewidth modulator's control signal via a nonlinear or piece-wise linear function shaper, which is designed so that the resulting frequency of the ICO or VCO is approximately the same as it would be in the case of ideal PWM-FM modulation at the given pulse-width.

As is the case in any approximation, the function shaper's approximation of the pulse-width-frequency characteristic of the ideal system is never ideally accurate. The system has to be designed so that in the worst case, the turn-on of the power switch occurs at or before current zero-crossing, i.e. while the current is conducted by an anti-parallel diode of the current switch. In effect, the turn-on is lossless because it occurs at zero current and zero voltage on the switch.

Other objects and advantages of the present invention will become apparent and be appreciated by referring to the following detailed description of a preferred embodiment of the invention considered in conjunction with the accompanying drawings.

DESCRIPTION OF THE DRAWINGS

FIG. 2 is a timing diagram illustrating the characteristic waveforms for the circuit shown in FIG. 1 in the case of traditional frequency modulation control of resonant switching with duty cycle D=0.5 and $f \geq f_{resonant}$.

FIG. 3 is a timing diagram illustrating the characteristic waveforms for the circuit shown in FIG. 1, at the same frequency as shown in FIG. 2, but with low duty cycle.

FIG. 4 is a timing diagram illustrating the waveforms of the circuit shown in FIG. 1, under conditions as shown in FIG. 3, utilizing the ideal combined control method disclosed in U.S. Pat. No. 4,535,399 issued to Szepesi.

DETAILED DESCRIPTION OF THE PREFERRED EMBODIMENT

Figure 1:
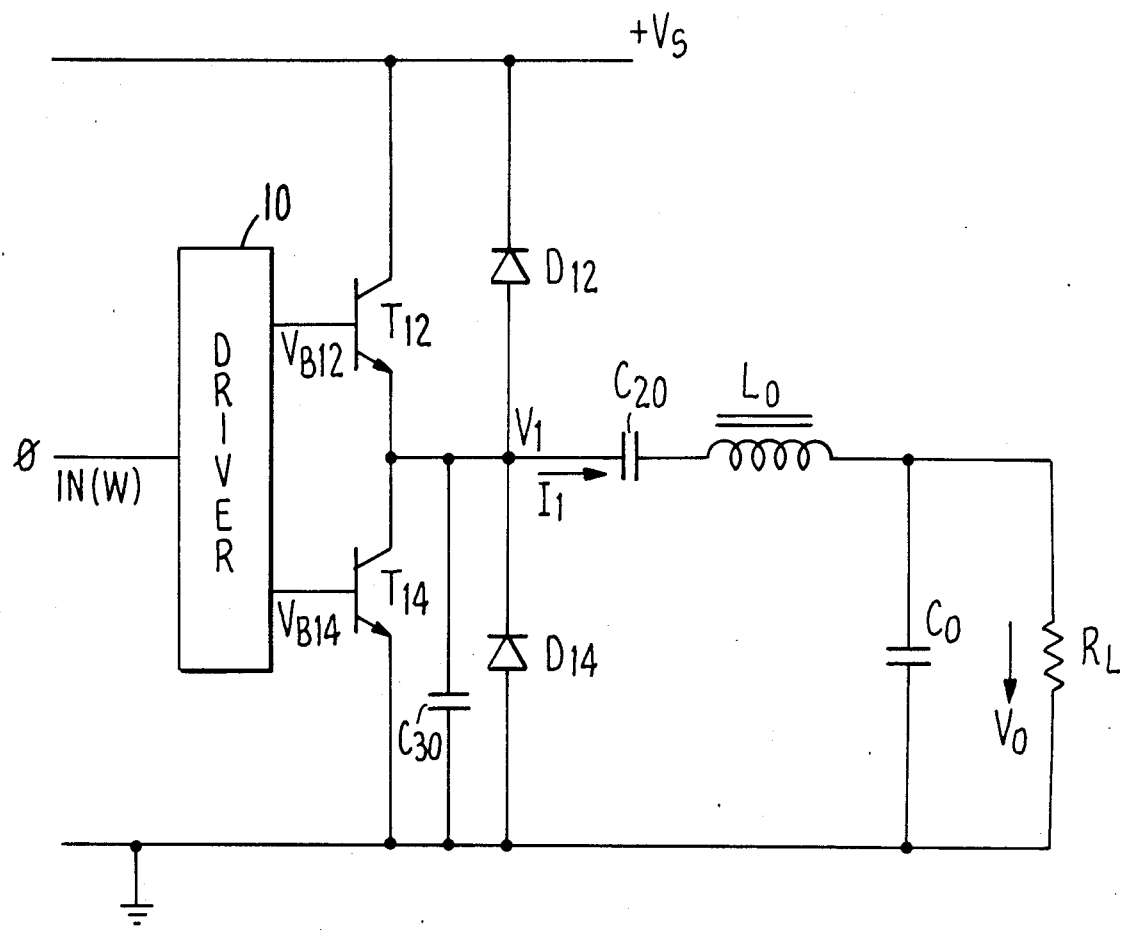
FIG. 1 is a schematic diagram illustrating a conventional tank circuit with a half bridge driver used in a typical, parallel resonant converter/inverter.

FIG. 1 shows a conventional tank circuit with a half bridge driver 10 of the type which is used in a typical parallel resonant converter/inverter. Power transistors $T_{12}$ and $T_{14}$ are alternatingly driven conductive by driver 10 which provides a pulsating DC input $V_{B12}$ and $V_{B14}$ to transistors $T_{12}$ and $T_{14}$, respectively.

Each power transistor $T_{12}$ and $T_{14}$ has associated with it a parallel-connected diode $D_{12}$ and $D_{14}$, respectively, which conducts current in the opposite direction and, therefore, provides reverse current sinking. Thus, the input to coupling capacitor $C_{20}$ is alternately grounded and then switched to the full supply voltage by driver 10. This provides a pulsating current drive to the load, the amount of power provided being a function of the duty cycle and the frequency of driver 10. Capacitor $C_{30}$ realizes a lossless snubber at turn-off by slowing down the rate of change of voltage V1.

FIG. 2 shows the characteristic waveforms for the circuit shown in FIG. 1 in the case of conventional frequency modulation with driver 10 duty cycle $D=0.5$ and frequency $f>f_{resonant}$. It can be seen that, at the moment of turn-on of either transistor $T_{12}$ or $T_{14}$, the voltage on the transistor is approximately zero because its associated diode $D_{12}$ or $D_{14}$ conducts the current.

FIG. 3 shows the waveforms for the same circuit at the same frequency with small pulse width, i.e., the duty cycle D is much less than 0.5. It can readily be seen that, in this case, the power transistors $T_{12}$ and $T_{14}$ turn on at almost maximum current and voltage. This means that if pure pulse width modulation is applied to a resonant inverter/converter, the efficiency drops considerably at lower output levels. Applying pure frequency modulation, on the other hand, results in a relatively high necessary frequency shift which is undesirable because it limits the size of capacitor $C_{30}$ and causes more serious EMI problems due to the broader spectrum.

As stated above, an ideal solution to this problem is disclosed in Szepesi's U.S. Pat. No. 4,535,399. The circuit disclosed therein applies high frequency feedback incorporating a phase locked loop to synchronize the turn-on instant of the power transistors to the zero crossings of the tank circuit current by changing the inverter's frequency. FIG. 4 shows the waveforms of the '399 Szepesi circuit at low duty cycle.

The solution provided by the present invention is an approximation of the ideal method disclosed in the '399 Szepesi patent. It trades circuit complexity for a little greater than ideal frequency shift inside the dynamic range.

Figure 5:
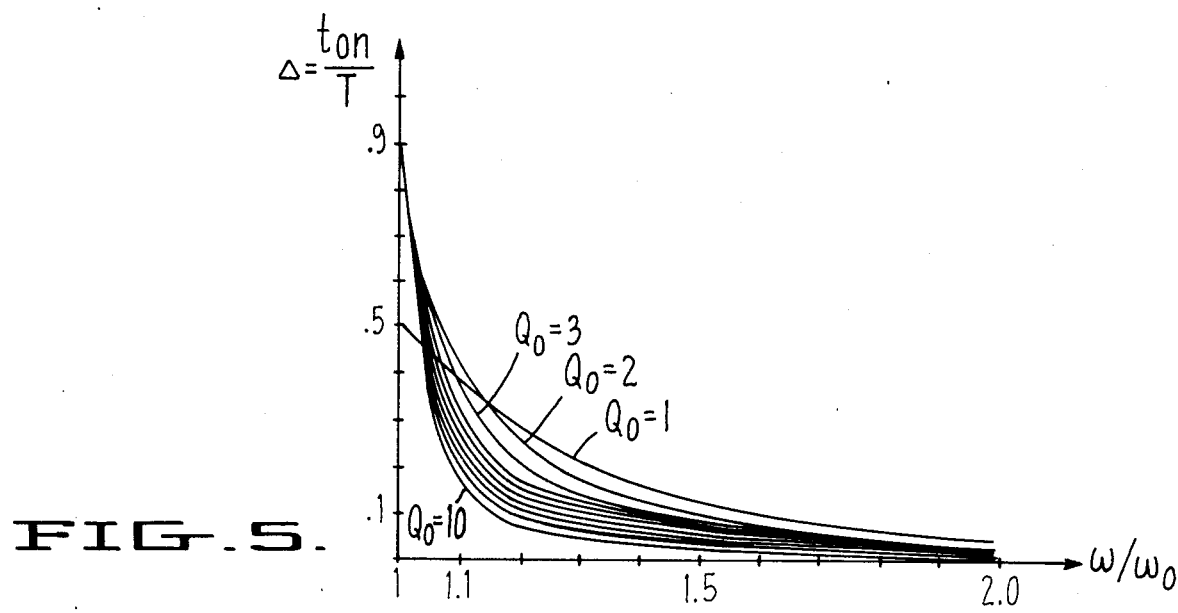
FIG. 5 is a graph illustrating pulse width vs. frequency shift curves for the PWM-FM control method disclosed in the '399 Szepesi patent for different tank circuit Q-factors.

FIG. 5 shows the pulse width vs. frequency shift curves for the ideal Szepesi PWM-FM modulator for different tank circuit Q-factors. Along these curves, as described in the '399 Szepesi patent, the phase shift of the tank circuit admittance always compensates the opposite phase shift of the describing function of the pulse-width modulated drive waveform.

Figure 6:
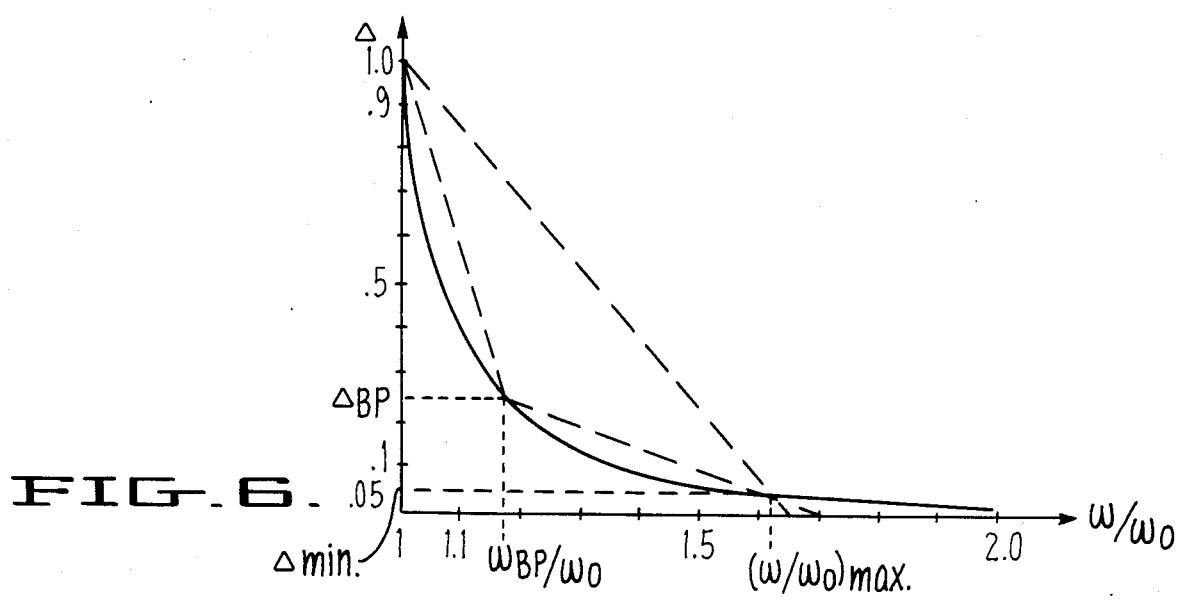
FIG. 6 is a graph illustrating a two-segment piecewise linear approximation of the pulse width vs. frequency shift curve shown in FIG. 5 in accordance with the present invention.
Figure 7:
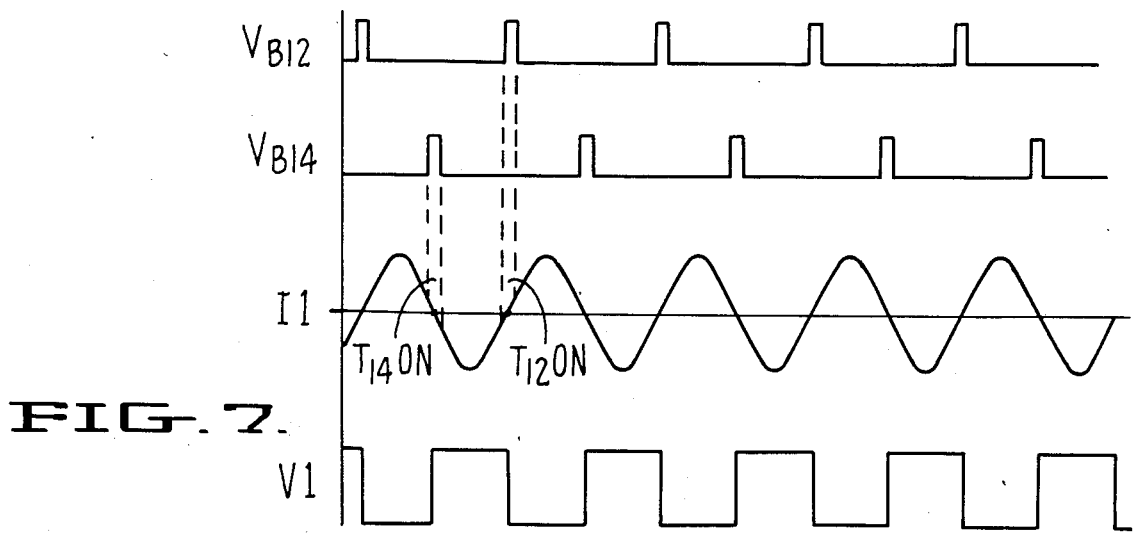
FIG. 7 is a timing diagram illustrating the characteristic waveform of the PWM-FM controlled powerstage utilizing a piecewise linear approximating function in accordance with the present invention.

Referring to FIG. 6, according to the present invention, the ideal curve (FIG. 5) corresponding to the lowest possible $Q_0$, which corresponds to the heaviest load, is approximated by a non-linear or a piecewise linear function so that it always stays to the right hand side of the original curve. In this case, the frequency shift along the approximating function produces a frequency value which is always larger than necessary for the ideal case. Consequently, the phase shift of the tank circuit is always higher than necessary to compensate for the phase shift of the pulse width modulator at any given pulse width. As illustrated in FIG. 7, this ensures the desired lossless turn-on of the power switch before the zero-crossing of the load current.

The approximating non-linear function is easiest to realize with a piecewise linear function. It can have any number of segments, but a two segment approximation, as shown by dashed line L2 in FIG. 6, is adequate in all practical cases. A straight line, i.e. single segment L1 in FIG. 6, approximation is adequate in most applications.

Figure 8:
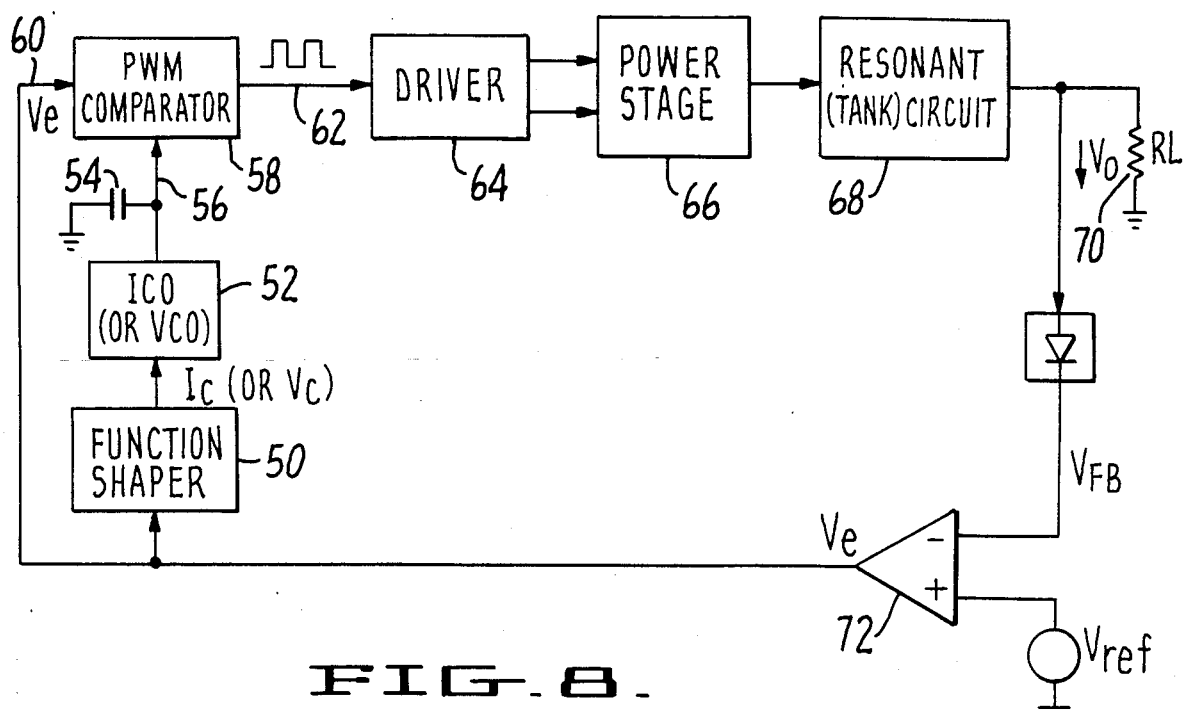
FIG. 8 is a block diagram illustrating a parallel resonant inverter which utilizes a non-linear or piecewise linear approximating technique in accordance with the present invention.

FIG. 8 shows a block diagram of a resonant inverter/converter which uses the PWM-FM approximating technique of the present invention.

The signal source of the circuit shown in FIG. 8 is VCO (or ICO) 52. It provides, with the help of timing capacitor 54, a sawtooth or triangular waveform for the clock input 56 of PWM comparator 58. The voltage $V_c$ applied to its control input 60 controls the pulse-width of the output signal 62 of PWM comparator 58. The output signal 62 of PWM comparator 58 provides the input signal of driver 64. Driver 64 includes logic circuitry to ensure alternate turn-on of the two transistors of the power stage 66 (i.e., $T_{12}$ and $T_{19}$ in FIG. 1) and performs the necessary signal level translations to drive the control electrodes of the power switching elements (the power switching elements can be transistors, FETs, IGTs, COMFETs, etc.).

Power stage 66 drives resonant circuit 68 through which load 70 is coupled to power stage 66. Resonant circuit 68 can be a parallel (tank) circuit, as shown in FIG. 1, but it can also be a series resonant circuit in the case of serial resonant inverters/converters. Load 70 can be coupled directly to the resonant circuit, as shown in FIGS. 1 and 6, or through a transformer if impedance matching or isolation is necessary. It can also be coupled via rectifiers if DC output is needed (e.g. in the case of DC/DC converters).

The output level of the inverter/converter can be controlled by voltage $V_c$. As stated above, this voltage controls the pulse width of the driving signal of power stage 66. The same voltage $V_c$ is fed to the input of a function shaper circuit 50 which generates the necessary tuning voltage $V_c$ or current $I_c$ for VCO or ICO 52 to control the oscillator's frequency according to the previously described requirements of the present invention.

If tight control of the output level is required, voltage $V_e$ can be controlled in a closed loop via an error amplifier 72. Error amplifier 72 compares the rectified output voltage $V_{FB}$ of the converter and a reference voltage $V_{ref}$ and provides the appropriate control voltage $V_c$ for the converter to maintain $V_{FB}=V_{ref}$.

Figure 9:
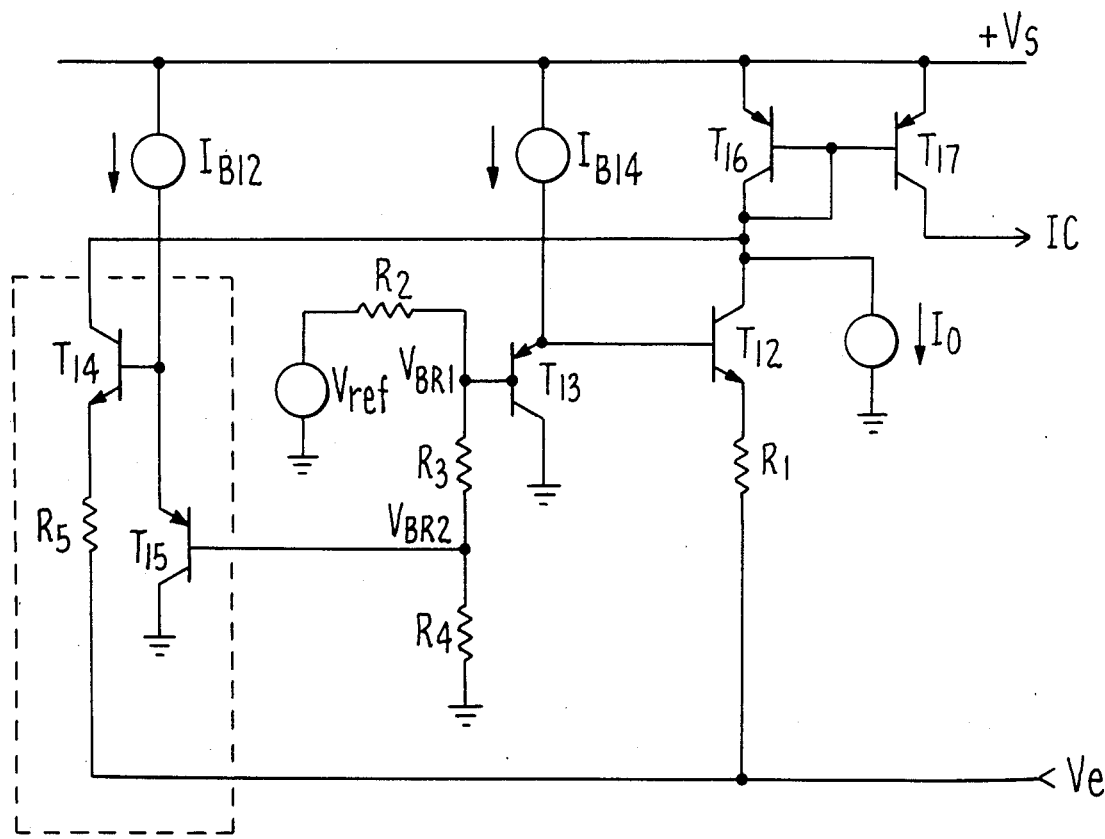
FIG. 9 is a schematic diagram illustrating an embodiment of a function shaper which can be used in the circuit shown in FIG. 8.

There are many well known possibilities for realizing the appropriate piecewise linear function of the function shaper 50 shown in FIG. 8. FIG. 9 shows an embodiment of a simple circuit which realizes the function shaper 50 for 1 or 2 segments in the case of a current controlled oscillator. The extra circuitry for the second segment is enclosed by the dashed line in FIG. 9. As can be seen, the circuitry to be added to the conventional PWM circuit is minimal.

As shown in FIG. 9, the tuning current $I_c$ of the ICO 52, i.e. the output current of function shaper 50, is the collector current of transistor $T_{16}$, which is equal to the collector current of transistor $T_{17}$, assuming that transistors $T_{16}$ and $T_{17}$ are ideally matched and $\beta \sim \infty$. That is, tuning current $I_c$ is the sum of the collector currents of transistors $T_{12}$ and $T_{14}$ The slope of the first segment is set by resistor $R_1$ and the position is set by the voltage $V_{BR1}$. In the case of a two segment approximation, at $V_e < V_{BR2}$, transistor $T_{14}$ begins to conduct and adds current to the output current. The slope increase is determined by the value of resistor $R_5$ while the position of the break-point is set by voltage $V_{BR2}$. Transistors $T_{13}$ and $T_{15}$ stabilize the break-point voltage values over temperature.

The circuit can be extended to any number of segments (break-points) by adding transistor pairs and scaling resistors to the circuit.

Figure 10:
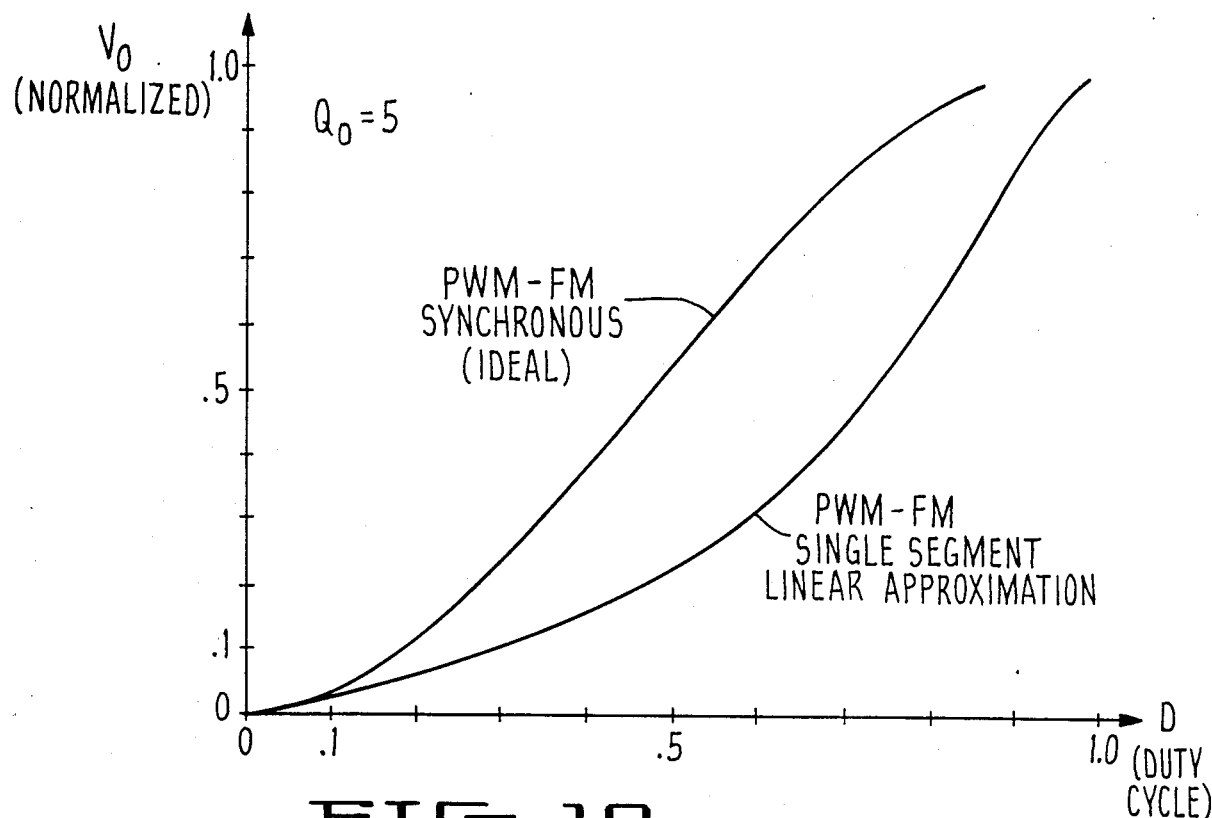
FIG. 10 is a graph illustrating normalized output voltage as a function of pulse-width for the ideal PWM-FM modulator and the approximated PWM-FM method of the present invention with a single-segment approximating function.

FIG. 10 shows the pulse width-output level transfer function of the PWM-FM modulator of the present invention in comparison with the ideal, synchronized case discussed in the above-mentioned '399 Szepesi patent. As can be seen, the transfer function in the single segment approximation is slightly more non-linear than the ideal case. If one chooses to use a better (2 or more segment) approximation, the corresponding curve lies between the two illustrated curves, very near to the ideal curve.

Figure 11:
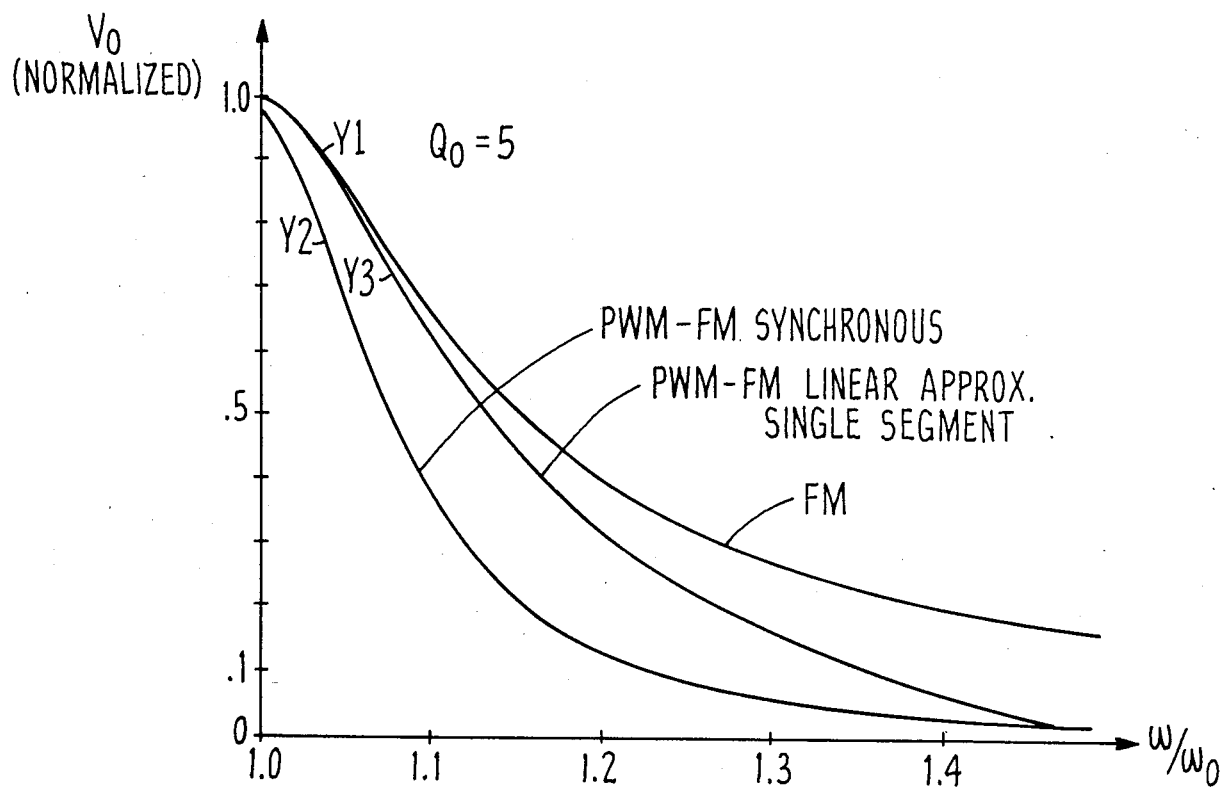
FIG. 11 is a graph illustrating the relative output level vs. necessary frequency shift, for three modulation techniques: conventional frequency modulation, ideal PWM-FM as disclosed in the '399 Szepesi patent, and single segment approximating PWM-FM in accordance with the present invention.

FIG. 11 shows the relative output level vs. necessary frequency shift for three control techniques: conventional FM, ideal PWM-FM as disclosed in the '399 Szepesi patent, and single segment PWM-FM approximation in accordance with the present invention. Here again, the better the approximation chosen, the closer the curve will be to the ideal curve, i.e., the less frequency variation is necessary to achieve the same dynamic range.

It should be understood that various alternatives to the embodiment described herein may be employed in practicing the present invention. It is intended that the following claims define the invention and that the structure and methods within the scope of these claims and their equivalents be covered thereby.

What is claimed is:

1. A circuit for controlling resonant power inverters/converters with a combined PWM-FM method comprising:
   (a) a power switch, comprising first and second controlled power switching elements, for transferring energy from a DC power supply to a load through a resonant coupling circuit;
   (b) first and second diodes, parallel with the first and second controlled switching element, respectively, to provide a unidirectional current path around the associated switching element when the associated switching element is turned off;
   (c) a driver circuit which provides a drive signal to control electrodes of the first and second power switching elements;
   (d) a pulse-width modulator having a first input which is connected to receive a timing signal from a voltage or current controlled oscillator and a second control input which is connected to receive a control voltage which controls the pulse-width of the output pulse sequence of the pulse-width modulator, the output providing the input signal to the driver circuit;
   (e) a voltage or current controlled oscillator the timing signal of which is connected to the first input of the pulse-width modulator, and having a frequency control input which is connected to the output of a nonlinear functionshaper, the frequency of the voltage or current controlled oscillator being controlled by the voltage or current connected to its frequency control input; and
   (f) a function shaper circuit the input of which is connected to the control voltage, the output voltage or current of the function shaper circuit being connected to the frequency control input of the voltage or current controlled oscillator to control the frequency of the oscillator as a single-valued nonlinear function of the control voltage.

2. The circuit in claim 1 wherein the nonlinear transfer function of the nonlinear function shaper is such that at every pulse-width, the oscillator's frequency is driven to a value by the function shaper that ensures that the power switch turns on either at exactly the zero crossing of the input current of a resonant coupling circuit or during the time the current is conducted by the diode connected in parallel with its associated power switching element to be turned on, thereby ensuring substantially zero voltage and substantially zero current on the power switching element at the turn-on instant, yielding minimum dynamic switching loss.

3. The circuit in claim 2 wherein the nonlinear transfer function is approximated by a segmented piecewise-linear function of one linear segment.

4. The circuit in claim 2 wherein the nonlinear transfer function is approximated by a segmented piecewise-linear function of a plurality of linear segments.

5. The circuit of claim 1 whereby an output quantity of the power inverter/converter is stabilized such that the control voltage is generated as the output voltage of a high gain error-amplifier one of the inputs of which is connected to a voltage proportional to the output quantity of the power inverter/converter circuit to be stabilized, and the other input of which is connected to a reference voltage, whereby the output quantity is maintained nearly constant and its value is controlled by the reference voltage.

6. The circuit of claim 5 wherein the output quantity is the output voltage of the power inverter/converter.

7. The circuit of claim 5 wherein the output quantity is the output current of the power inverter/converter.

8. The circuit of claim 5 wherein the output quantity is the output power of the power inverter/converter.

* * * * *